US007321929B2

United States Patent
Rolfe

(10) Patent No.: US 7,321,929 B2
(45) Date of Patent: Jan. 22, 2008

(54) PROGRAMMABLE REMOTE DEVICE MANAGEMENT SYSTEM FOR LOCALLY OR REMOTELY CONTROLLING AND/OR CONFIGURING A COMMUNICATION NETWORK SWITCH

(75) Inventor: Edward G. Rolfe, Carlisle, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 1120 days.

(21) Appl. No.: 10/632,420

(22) Filed: Aug. 1, 2003

(65) Prior Publication Data

US 2005/0027841 A1 Feb. 3, 2005

(51) Int. Cl.
*G06F 15/173* (2006.01)

(52) U.S. Cl. ...................................... 709/223; 709/238

(58) Field of Classification Search ................ 709/223, 709/238; 370/218–220, 351–360; 379/9, 379/15.01
See application file for complete search history.

(56) References Cited

U.S. PATENT DOCUMENTS

| 6,070,192 | A | 5/2000 | Holt et al. | |
|---|---|---|---|---|
| 6,097,723 | A * | 8/2000 | Fielding et al. | 370/395.2 |
| 6,219,805 | B1 | 4/2001 | Jones et al. | |
| 6,246,678 | B1 * | 6/2001 | Erb et al. | 370/352 |
| 6,330,601 | B1 | 12/2001 | French et al. | |
| 6,697,845 | B1 * | 2/2004 | Andrews | 709/209 |
| 7,200,865 | B1 * | 4/2007 | Roscoe et al. | 726/12 |

\* cited by examiner

*Primary Examiner*—Krisna Lim
(74) *Attorney, Agent, or Firm*—Blakely Sokoloff Taylor & Zafman LLP

(57) ABSTRACT

A programmable remote device management system for remotely controlling and/or configuring a communication network switch over a computer network. The system includes a command processing engine coupled to a user interface, a protocol translation engine, a scripting engine and to a filtering engine. The command processing engine is adapted to receive at least one switch command via the user interface and to process the switch command for providing at least one validated or otherwise processed switch command. The switch command is provided from the remote device management system to the communication network switch over the computer network. With this arrangement, a user can efficiently communicate a plurality of validated or otherwise processed control and/or configuration commands to one or more of the communication network switches from a remote location for performing a variety of network switch management operations as if similarly executed local to the communication network switch.

20 Claims, 4 Drawing Sheets

PROGRAMMABLE REMOTE DEVICE MANAGEMENT SYSTEM FOR LOCALLY OR REMOTELY CONTROLLING AND/OR CONFIGURING A COMMUNICATION NETWORK SWITCH

FIELD OF THE INVENTION

The present invention relates to a communications system. More particularly, the present invention relates to a remote device management system for locally or remotely controlling and/or configuring a communication network switch over a computer network.

BACKGROUND OF THE INVENTION

As is known, management functions (e.g., configuring, monitoring, and the like) for communication network switches may be entered locally at a command line interface, which is incorporated on the communication network switch. The command line interface typically includes a local user interface that permits a network administrator to enter a number of various network switch control and/or configuration commands. The network switch control and/or configuration commands are processed locally by the command line interface and communicated to various elements of the communication network switch for configuring elements of the communication network switch (e.g., turning ports on/off), for monitoring data flow through the switch (e.g., counting data packets) and for performing administrative network management operations (e.g., naming equipment).

Typically, a command line interface that is incorporated on the communication network switch requires that a network administrator be physically located proximate to the communications network switch while entering control and/or configuration commands via the local user interface, as described above. In order to provide remote access to the local command line interface, some command line interfaces are provided with communication ports, such as an RS232 port, Telnet port or the like, to permit remote access to the local command line interface using a personal computer, for example. In this arrangement, the network administrator can remotely access the local command line interface located on the communications network switch for providing control and/or configuration commands to the network switch in a similar manner as though the network administrator were providing control and/or configurations commands to the communication network switch from the local user interface.

Furthermore, in the event that it is desired to communicate similar control and/or configuration commands to a number of different network switches, the network administrator has to remotely access each of the local command line interfaces, which are associated with each of the number of different network switches, for providing the control and/or configuration commands to each of the number of different network switches. This redundant process can be very time consuming and inefficient, in particular, if the network administrator has to communicate with a large number of different network switches to provide similar configuration commands.

In addition, processing and/or execution of the control and/or configurations commands remains local to the network switch(es). In other words, regardless as to whether the control and/or configuration commands are received at the command line interface, via the local user interface (e.g., locally entered commands) or via the communication port (e.g., remote entered commands), the control and/or configuration commands are processed and/or executed locally by the local command line interface and, thereafter, provided to the communication network switch, as described above. In some instances, the local command line interface may require significant resources from the communication network switch, such as processor bandwidth and memory space, for processing the control and/or configuration commands, as described above, which can retard other various processing operations executed by the network switch.

It would, therefore, be desirable to overcome the aforesaid and other disadvantages.

SUMMARY OF THE INVENTION

The present invention provides a programmable remote device management system for remotely (or locally) controlling and/or configuring a communication network switch. With this arrangement, a user can efficiently communicate a plurality of validated or otherwise processed control and/or configuration commands to the communication network switch from a remote location for performing a variety of network switch management operations. While the remote device management system of the present invention is primarily shown and described in conjunction with a communication network switch, it is understood that the remote device management system can be employed to control other communication equipment that may be similarly constructed and arranged.

In one aspect of the invention, a programmable remote device management system is coupled to at least one communication network switch over a computer network. The programmable remote device management system includes a processor coupled to receive at least one control and/or configuration command from a user interface. The processor is further coupled to a protocol translation engine. The processor is adapted to process the at least one switch command for providing at least one validated switch command. The validated switch command is communicated to the at least one communication network switch, via the protocol translation engine and the computer network, to control predetermined attributes of the at least one communication network switch.

In another aspect of the present invention, a communication network switch is provided as being adapted to receive at least one validated or otherwise processed control and/or configuration command over a computer network from a remote device management system. The communication network switch includes a master agent in a communication relationship with the remote device management system. The computer network switch further includes a plurality of sub-agents, which are in a communication relationship with the master agent, as well as, with a configuration controller that is also included on the network switch. The configuration controller is in a communication relationship with a data communication scheduler included on the network switch. In operation, the master agent is operative to receive and redirect at least a first validated switch command to a predefined one of the plurality of sub-agents for processing the first validated switch command to provide at least a first configuration command. Further, the configuration controller receives and processes the first configuration command to provide at least a first actuation signal to at least one interface port of the network switch to actuate at least one element of the at least one interface port to a predetermined state for controlling equipment coupled to the interface port.

BRIEF DESCRIPTION OF THE DRAWINGS

The foregoing and other objects of this invention, the various features thereof, as well as the invention itself, can be more fully understood from the following description, when read together with the accompanying drawings in which.

DETAILED DESCRIPTION OF THE INVENTION

Figure 1:
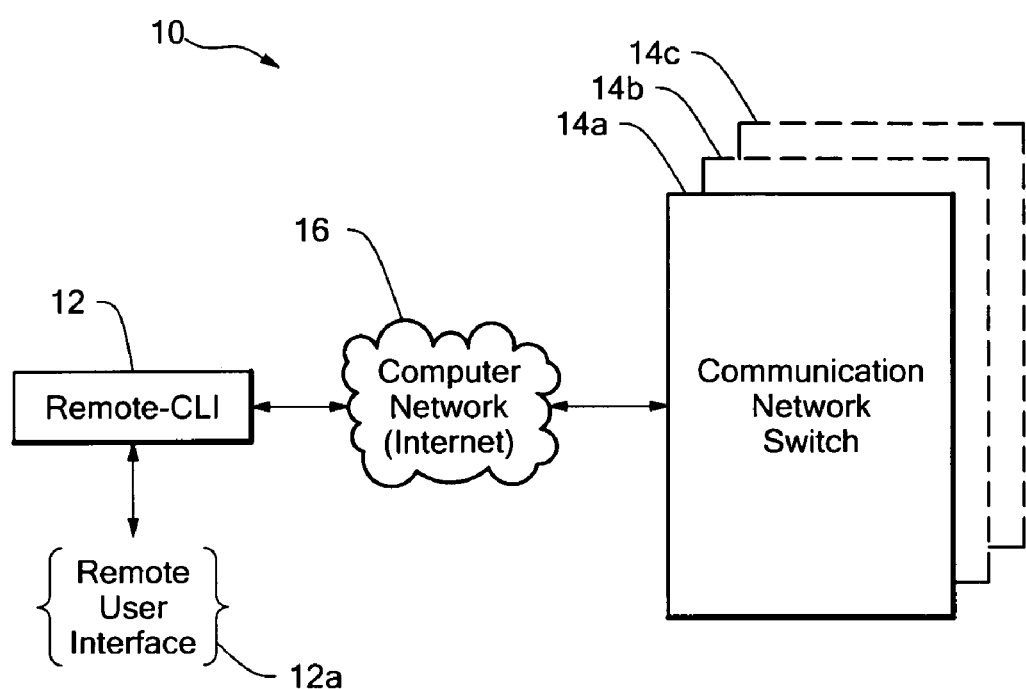
FIG. 1 is a block diagram of a remote command line interface adapted to remotely process and provide control and/or configuration information to one or more communication network switches over a computer network, in accordance with the present invention.

FIG. 1 shows an exemplary embodiment of a remotely controlled and configured data processing system 10. The system 10 includes a programmable remote command line interface 12 (hereinafter referred to as "remote-CLI") coupled to a plurality of communication network switches 14a, 14b, 14c, over a computer network 16, such as the Internet. The remote-CLI 12 includes a remote user interface 12a that permits a user to enter a plurality of control and/or configuration commands to the remote-CLI 12, which commands are communicated to one or more of the plurality of communication network switches 14a, 14b, 14c, over the computer network 16 for controlling various attributes of the communication network switches 14a, 14b, 14c, as will be described in further detail below.

Furthermore, the remote user interface 12a permits a user to enter a plurality of global control and/or configuration commands to the remote-CLI 12, which global commands are simulcasted (e.g., broadcasted simultaneously) to two or more network switches 14a, 14b or 14c) over the computer network 16 to the plurality of communication network switches 14a, 14b, 14c. Although it should be understood that the remote-CLI 12 can communicate commands to one or more of the plurality of communication network switches 14a, 14b, 14c, in order to simplify the description, communications between the remote-CLI 12 and the communication network switch 14a (hereinafter referred to as "network switch 14a") will be described in detail herein with the understanding that similar interactions can be executed between the remote-CLI 12 and any one, or group or subset of the other communication network switches 14b, 14c in a similar manner.

Although not specifically shown, it should be understood that the remote-CLI 12 can be implemented in hardware and/or software. For example, the remote-CLI 12 can be provided as a graphical user interface (GUI) running on a portable personal computer, such as a laptop computer. In other embodiments, the remote-CLI 12 can be provided as a GUI or applet running on a wireless digital personal assistant (PDA), or other computing devices not specifically described herein.

In one exemplary embodiment, the network switch 14a can be similarly constructed and arranged as the headend controller shown and described in co-pending application Ser. No. 10/196,342 filed on Jul. 16, 2002, entitled, "AN INTEGRATED SYSTEM AND METHOD FOR CONTROLLING TELECOMMUNICATION NETWORK DATA COMMUNICATED OVER A LOCAL AREA NETWORK AND STORAGE DATA COMMUNICATED OVER A STORAGE AREA NETWORK," which is assigned to the assignee of the present invention, and which is incorporated herein by reference in its entirety.

Figure 2:
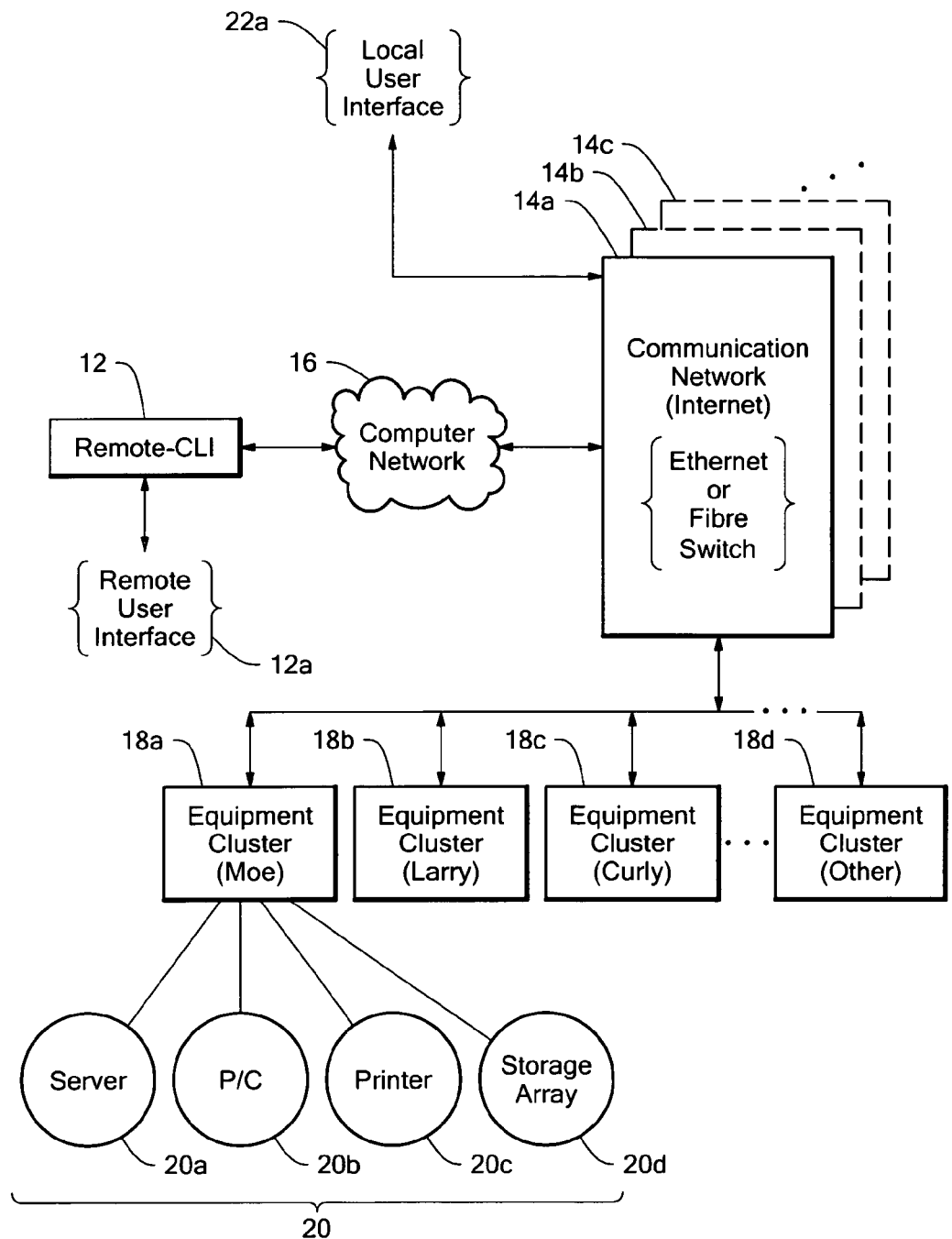
FIG. 2 is a detailed block diagram of a predetermined one of the communication network switches of FIG. 1.

Referring to FIG. 2, in the exemplary embodiment, the network switch 14a includes a local user interface 22a that permits a user to enter a plurality of control and/or configuration commands locally to the network switch 14a for controlling various attributes of the network switch 14a, as will be described in further detail below. A plurality of equipment clusters 18a, 18b, 18c, 18d, which are collectively referred to as equipment clusters 18, are also coupled to the network switch 14a. Each of the equipment clusters 18 can include either an Ethernet or a Fibre channel-based device that is operative to perform a number of inter and/or intra equipment cluster 18 computing tasks. The first equipment cluster 18a is coupled to a plurality of computing devices 20, including but not limited to, a server 20a, a personal computer 20b, a printer 20c and storage array 20d. It should be readily understood that the remaining equipment clusters 18b, 18c, 18d can also be coupled to similar computing devices 20, as well as, to a plurality of other computing devices not specifically described herein.

Figure 3:
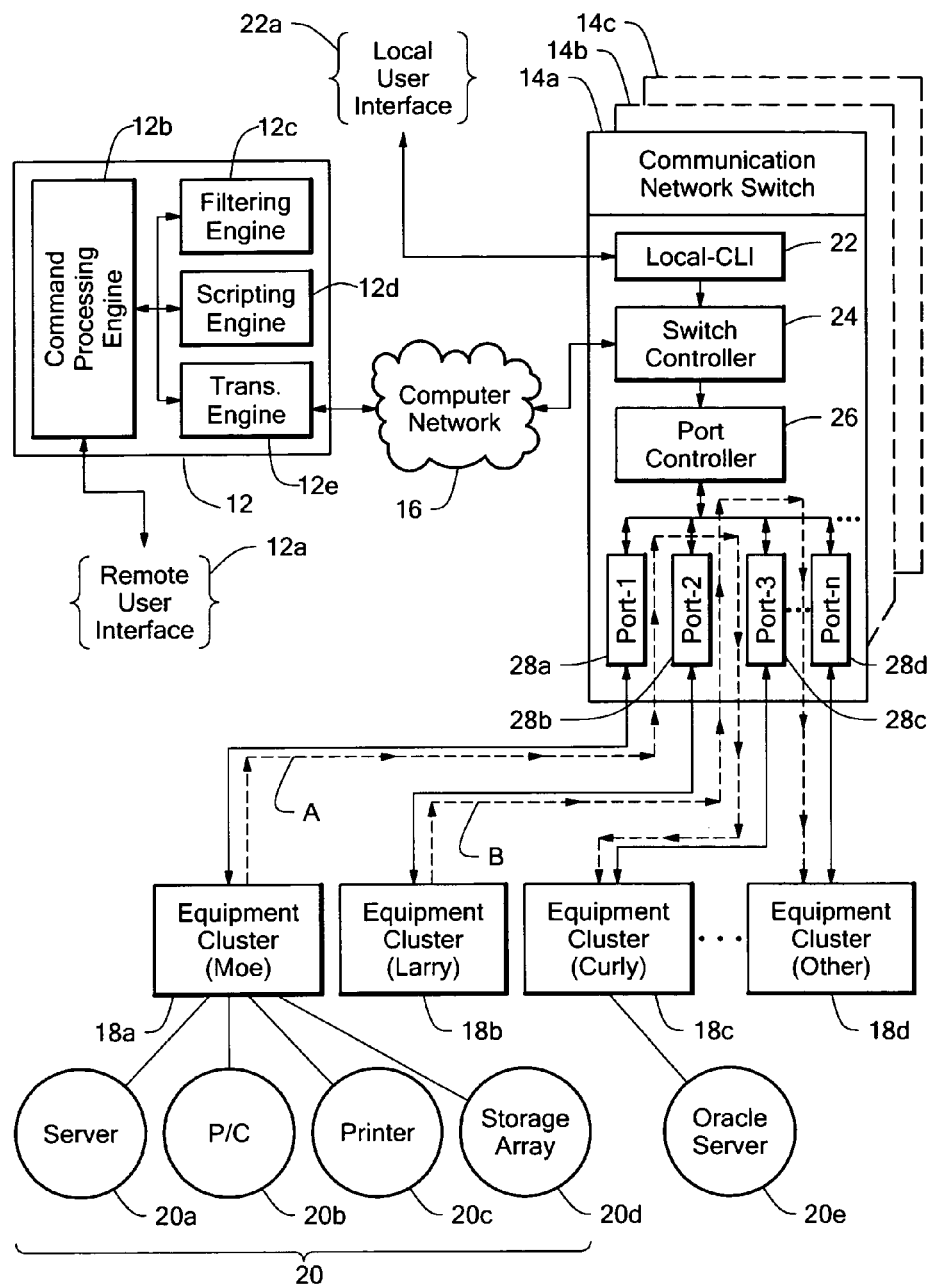
FIG. 3 is a further detailed block diagram of the predetermined one of the communication network switches and the remote command line interface of FIG. 1.

Referring to FIG. 3, shown is an expanded view of the remote-CLI 12 and the network switch 14a, as described above with respect to FIGS. 1 and 2. It should be understood that the remaining plurality of network switches 14b, 14c are similarly constructed and arranged. In the exemplary embodiment, the remote-CLI 12 includes a command processing engine 12b coupled to receive the plurality of network switch control and/or configuration commands from the remote user interface 12a. In an embodiment, the remote user interface 12a can include one of a plurality of different interfaces, such as a keyboard, touch sensitive graphical user interface, joy stick, and the like.

The command processing engine 12b is coupled to a filtering engine 12c, a scripting engine 12d and to a protocol translation engine 12e. The protocol translation engine 12e of the remote-CLI 12 is coupled to the network switch 14a over the computer network 16. The command processing engine 12b operates to interact with the remote user interface 12a by prompting a user for network switch control and/or configuration commands, as well as to provide information to the user after satisfying the network switch control and/or configuration commands.

In the exemplary embodiment, the remote-CLI 12 runs a first predetermined operating system that is directly compatible with a second predetermined operating system running on the network switch 14a. The control and/or configuration commands received at the command processing engine 12b can be forwarded to the network switch 14a, via the protocol translation engine 12e, but without any further processing by the protocol translation engine 12e. In this instance, the protocol translation engine 12e is provided as an output of the remote-CLI 12 and for porting the control and/or configuration commands to the network switch 14a over the computer network 16.

In another exemplary embodiment, the remote-CLI 12 runs a third predetermined operating system that is different from a fourth predetermined operating system running on the network switch 14a. The control and/or configuration commands received at the command processing engine 12b can be forwarded to the network switch 14a, via the protocol translation engine 12e, after the protocol translation engine 12e processes the control and/or configuration commands to be compatible with the fourth operating system running on the network switch 14a. In this instance, the protocol translation engine 12e is provided to translate the control and/or configuration commands from a language compatible with the third operating system running on the remote-CLI 12 to another language compatible with the fourth operating system running on the network switch 14a. Further, the protocol translation engine 12e is also provided as an output of the remote-CLI 12, and for porting the translated control and/or configuration commands to the network switch 14a over the computer network 16.

In an embodiment, the network switch control and/or configuration commands include, but are not limited to, a GET command, a SET command, a RUN SCRIPT command and a SIMULCAST command. Further control and/or configuration commands will be well known to those of ordinary skill in the art. The command processing engine 12b further processes each command received, via the remote user interface 12a, to verify syntax, command validity, command values and to provide an auto-complete feature for filling in partially entered commands.

The GET command instructs the command processing engine 12b to get predetermined information or attributes associated with the communication network switch 14a, (e.g., its operation and configuration). The GET command may further instruct the command processing engine 12b to get information or attributes associated with the plurality of equipment clusters 18, such as the names of the plurality of equipment clusters 18 (e.g. Moe, Larry, Curly or other), operational status, bandwidth, data communication rates and the like. The SET command instructs the command processing engine 12b to set the predetermined information or attributes associated with the communication network switch 14a, (e.g., its operation and configuration) as well as to set the plurality of equipment clusters 18 to a predefined status and/or value, such as setting one or more interface-ports 28a, 28b, 28c, 28d, which are associated with the plurality of equipment clusters 18, to an on-status or to an off-status for controlling communications between the plurality of equipment clusters (e.g., controlling inter cluster communications). The RUN SCRIPT command instructs the command processing engine 12b to run a predetermined script file associated with the scripting engine 12d, such as a script file for executing the SET operation, at a particular time of day, for example, for setting one or more ports associated with the plurality of equipment clusters 18 to an on-status or to an off-status, as described above, for controlling communications between the plurality of equipment clusters 18. The SIMULCAST command instructs the command processing engine 12b to transmit one or more commands to the plurality of network switches 14a, 14b, 14c simultaneously for simultaneously controlling attributes and/or configurations in each of the plurality of network switches 14a, 14b, 14c.

The protocol translation engine 12e is adapted to translate commands received from the remote user interface 12a, via the command processing engine 12b, to a predetermined communication protocol suitable for communication over the computer network 16 to the network switch 14a. In one embodiment, the predetermined communication protocol is the simple network management protocol (SNMP) and the protocol translation engine 12e includes an SNMP library, such as Brass™, which is provided by SNMP Research International of Knoxville, Tenn.

The scripting engine 12d includes a plurality of executable software programs that are each adapted to carry out a number of predetermined processing operations. In the exemplary embodiment, the scripting engine 12d is written in the C language and uses Tool Command Language (TCL) scripting libraries. It should be understood that a number of other scripting engines can be used to provide the scripting engine 12d, such as Perl, Python, Ruby, BASH and the like. The TCL includes native general programming constructs, such as flow control and variable assignment. The TCL library has been extended for use in this exemplary embodiment to include a number of programming constructs that are operable to execute a number of network control and/or configuration commands on the network switch 14a, such as, but not limited to, the GET, SET, RUN SCRIPT and SIMULCAST commands.

It should be understood that the exemplary network switch control and/or configuration commands, which can be entered to the remote-CLI 12 using the remote user interface, are fully extensible to include a plurality of other network switch control and/or configuration commands not specifically described herein. It should be further understood that the exemplary programming constructs, which are executed by running the appropriate TCL from the scripting engine 12d of the remote CLI 12, are also fully extensible to include a plurality of other programming constructs and/or batch files not specifically described herein. Consequently, a user of the remote-CLI 12 can extend the exemplary network switch control and/or configuration commands by entering a plurality of customized network switch control and/or configuration commands into the remote user interface 12a or by entering a plurality of customized programming constructs into the scripting engine using the TCL of the scripting engine. For example, the remote-CLI 12 can be extended to communicate with an Oracle-based server (e.g., database), such as the Oracle-based server 20e coupled to equipment cluster 18c, for monitoring bandwidth resource allocations to the Oracle-based server 20e and to adjust the bandwidth resource allocations to optimize usage of the Oracle-based server 20e.

The filtering engine 12c includes a plurality of predetermined data mining filters that are operative to filter a plurality of information received from the protocol translation engine and to provide the filtered information to the remote user interface 12a, via the command processing engine 12b. In an embodiment, the filtering engine 12c is implemented utilizing a regular expression pattern matching engine contained within the TCL library of the scripting engine 12d. Further, the filtering engine 12c provides a mechanism for simulating a structured query language (SQL) SELECT and WHERE statements. The SELECT statement, in SQL as applied to database technologies, is used to retrieve all the data in all the rows of a specified table. The WHERE statement specifies a condition. For example, if the following characters: SELECT*FROM WINE_LIST WHERE YEAR=1984, abstracted from the base CLI syntax and grammar, are provided to the remote CLI 12, regular expression pattern matching is applied to the condition value and logically AND'd with all other specified conditions. If the expression, as applied to the queried data set, evaluates to true, either the entire row, or just the selected matching elements can be returned and provided to the user, via the remote user interface 12a.

In the exemplary embodiment, the data mining filters can include one or more of the exemplary data mining filters, as described in further detail below.

The following example data mining filter will retrieve the total link congestion for any link in which the source group is called Community:

policyreport get policystatistics -totalcongestion. -key_sourcegroup Community

The following example data mining filter will retrive the total link congestion for any link in which the source group starts with the capital letter 'C':

policyreport get policystatistics -totalcongestion. -key_sourcegroup ^C$

In both of the examples of data mining filter, as described above, the values given to the two options -totalcongestion and -key_sourcegroup are TCL regular expresssions. For each datum, the values are logically AND'd and all specified attributes match, depending upon how the data processing engine is dynamically configured, either the entire row (in this case the matching row of policy statistics) is returned to the user interface, or just the matching columns of the row (in this case, the column for -totalcongestion and the column for -key_sourcegroup).

In another embodiment, the filtering engine 12c can be used for selecting which rows should/can be SET. For example, the following command returns all Fibre Channel port interface numbers that are of type GPORT:

port get fcconfig -type gport -key_interface

The following example then illustrates how a future embodiment/extension of the filtering engine can be used to set all ports of type GPORT to a down (or offline) status:

port set fcconfig -type gport -portstatus down.

The process of querying the existing data set and/or filtering matching entries against the input values, is the same, regardless of operation type and results in a filtering of the aggregated datum down to a subset upon which the command will act: either to display the matching subset data to the user interface, or to change as part of the SET operation.

In the exemplary embodiment, the network switch 14a includes a local command line interface 22 (hereinafter referred to as "local-CLI 22") coupled to a switch controller 24. The local-CLI 22 is similarly constructed and arranged as the remote-CLI 12, as will be described in further detail below with respect to FIG. 4. In FIG. 3, the switch controller 24 is coupled to a port controller 26 and to the remote-CLI 12, via the computer network 16. The port controller 26 is coupled to the plurality of equipment clusters 18, via a plurality of interface-ports 28a, 28b, 28c, 28d (hereinafter collectively referred to as "ports 28"). In this arrangement, the switch controller 24 located on the network switch 14a can receive a plurality of network switch control and/or configuration commands, as described above or other customized network switch control and/or configuration commands, indirectly from the remote-CLI 12, over the computer network 16 or directly from the local-CLI 22. The switch controller 24 processes the network switch control and/or configuration commands and communicates the processed commands to the port controller 26 for actuating various aspects of the ports 28 to control the equipment clusters 18.

In one specific example, the switch controller 24 can process a predetermined control and/or configuration command (e.g., SIMULCAST command) and communicate the processed command to the port controller 26 for actuating port 28a to couple port 28a to port 28c for respectively permitting equipment cluster 18a to communicate a first plurality of information to equipment cluster 18c during a first predetermined time interval, as represented by the dashed line "A." The communication of the first plurality of information from the equipment cluster 18a to the equipment cluster 18c during the first predetermined time interval defines a first bandwidth or a first quality of service (QoS) allocated to the equipment cluster 18a. The first predetermined time interval for which equipment cluster 18a is permitted to communicate the first plurality of information to equipment cluster 18c, which defines the first QoS allocated to equipment cluster 18a, can be adjusted by the port controller 26 to increase or decrease the first predetermined time interval to respectively increase or decrease the QoS allocated to the equipment cluster 18a.

Similarly, the switch controller 24 can process a predetermined control and/or configuration command (e.g., SIMULCAST command) and communicate the processed command to the port controller 26 for actuating port 28b to couple port 28b to port 28d for respectively permitting equipment cluster 18b to communicate a second plurality of information to equipment cluster 18d during a second predetermined time interval, as represented by the dashed line "B." The communication of the second plurality of information from the equipment cluster 18b to the equipment cluster 18d during the second predetermined time interval defines a second bandwidth or a second QoS allocated to the equipment cluster 18b. The second predetermined time interval for which equipment cluster 18b is permitted to communicate information to equipment cluster 18d, which defines the second QoS allocated to equipment cluster 18b, can also be adjusted by the port controller 26 to increase or decrease the second predetermined time interval to respectively increase or decrease the QoS allocated to equipment cluster 18b.

It should be understood that the above-described communications between the equipment cluster 18a and 18c, as well as the communications between the equipment clusters 18b and 18d, have been described for exemplary purposes and that a number of permutations of communications between pairs of the plurality of equipment clusters 18 are possible, via the ports 28 of the network switch 14a. Furthermore, the network switch 14a can be controlled to schedule and/or allocate a number of QoSs, each of which corresponds to one of the number of permutations of communications between the pairs of the plurality of equipment clusters 18.

Figure 4:
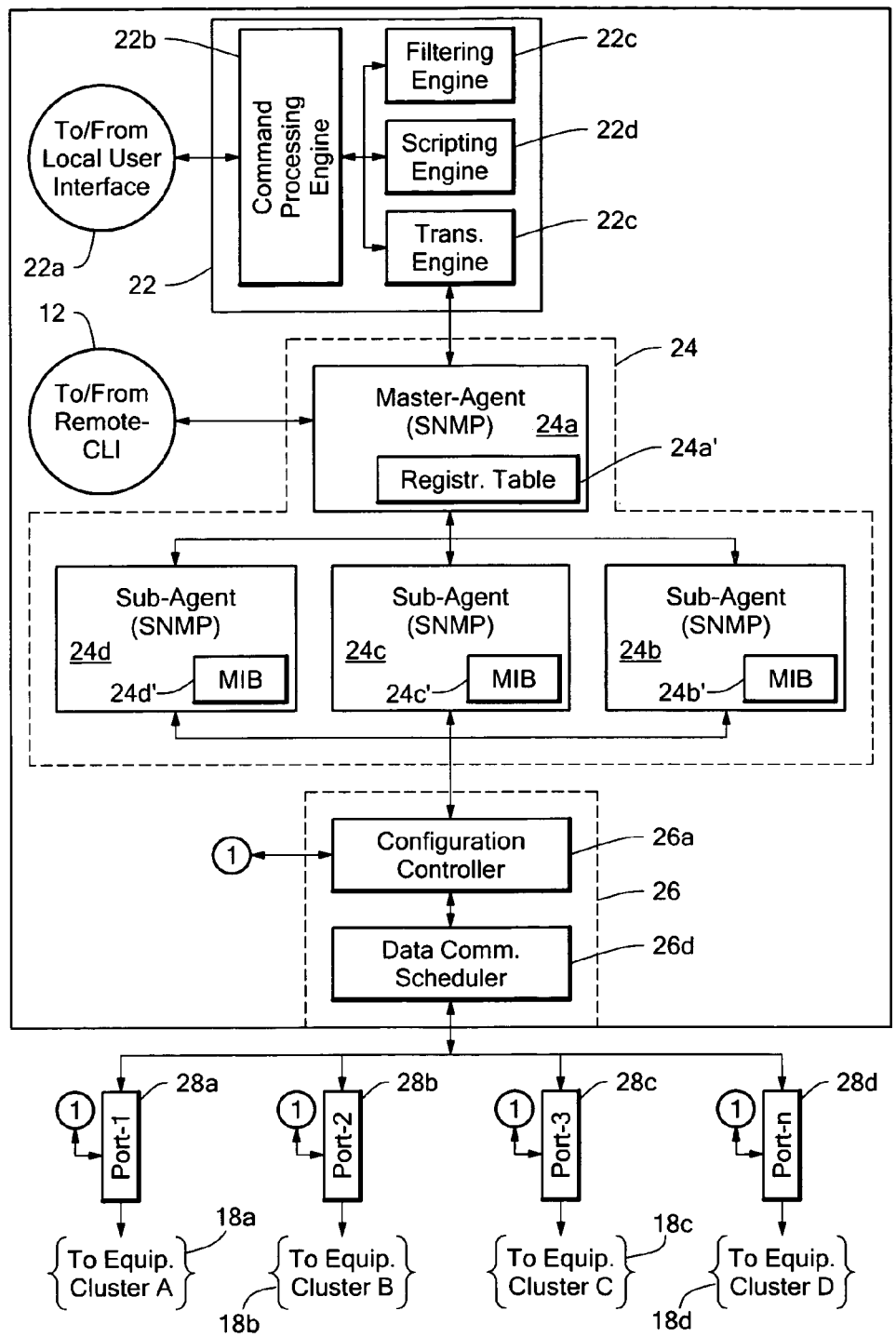
FIG. 4 is a further detailed block diagram of the predetermined one of the communication network switches of FIG. 3.

Referring now to FIG. 4, shown is an expanded view of the network switch 14a of FIG. 3. In FIG. 4, the local-CLI 22 is similarly configured and arranged as the remote-CLI 12 (FIG. 3), as described above, and includes a command processing engine 22b coupled to receive a plurality of network switch control and/or configuration commands from the local user interface 22a. The command processing engine 22b is also coupled to a filtering engine 22c, a scripting engine 22d and to a protocol translation engine 22e. The command processing engine 22b operates to interact with the local user interface 22a by prompting the local user 22a for network switch control and/or configuration commands, as well as to provide information to the user after satisfying the network switch control and/or configuration commands.

The switch controller 24 located on the network switch 14a includes a master-agent 24a coupled to plurality of sub-agents 24b, 24c, 24d. The master-agent 24a is further coupled to receive the plurality of network switch control and/or configuration commands from the remote-CLI 12, which commands are initially entered at the remote user interface 12a (FIG. 3). In addition, the master-agent 24a is coupled to receive the plurality of network switch control and/or configuration commands from the local-CLI 22, which commands are initially entered at the local user interface 22a.

In the exemplary embodiment, the local-CLI 22, the master agent 24a and the plurality of sub-agents 24b, 24c, 24d are adapted for communicating using the SNMP protocol. The master-agent 24a includes a registration table, which stores a plurality of information associated with each of the plurality of sub-agents 24b, 24c, 24d. In an embodiment, the registration table 24a' stores predetermined network switch operations, such as PORT-UP, PORT-DOWN or the like, and associates each of these network switch operations with at least one of the sub-agents 24b, 24c, 24d for execution.

The plurality of sub-agents 24b, 24c, 24d each include a Management Information Base (MIB) 24b', 24c', 24d'. Each MIB 24b', 24c', 24d' respectively defined on each of the plurality of sub-agents 24b, 24c, 24d includes a number of network switch operations and corresponding operations or sequences that should be executed to implement each of the network switch operations. Furthermore, each MIB 24b', 24c', 24d' can be extended to include additional network switch operations, however, after adding a network switch operation and any related operation or sequence steps for implementing the network switch operation, the network switch 14a should be re-booted to permit the associated sub-agent 24b, 24c or 24d to re-register the contents thereof, including the recently added network switch operation, to the registration table 24a' located on the master-agent 24a.

It should be understood that even though each MIB 24b', 24c', 24d' can be extended to include additional network switch operations, the sub-agent 24b, 24c or 24d corresponding to an extended MIB 24b', 24c' or 24d' should also be similarly extended or updated with the additional network switch operations. In order to extend or update the sub-agent 24b, 24c or 24d corresponding to the extended MIB 24b', 24c' or 24d', as described above, the sub-agent 24b, 24c or 24d should be recompiled with the additional network switch operations and/or functionality and then re-loaded onto the network switch 14a in place of the previously loaded sub-agent 24b, 24c or 24d and corresponding previously loaded MIB 24b', 24c' or 24d'.

The port controller 26 located on the network switch 14a includes a configuration controller 26a coupled to each of the plurality of sub-agents 24b, 24c, 24d. The configuration controller 26a is coupled to a data communication scheduler 26b, which is further coupled to each of the ports 28. The configuration controller 26 is adapted to communicate configuration and/or control information to the data communication scheduler 26b and to one or more of the ports 28 to permit communications between two or more of the plurality of equipment clusters 18.

For example, the configuration controller 26a can communicate configuration and control information to the data communication scheduler 26b and to the interface ports 28a, 28c to permit communication between equipment clusters 18a and 18c during a first predetermined interval. In the exemplary embodiment, communication between the equipment clusters 18a and 18c is represented by the dashed line "A," as shown in FIG. 3. In FIG. 4, the configuration controller 26a can also communicate control and/or configuration information to the data communication scheduler 26b and to interface ports 28b, 28d to permit communication between equipment clusters 18b and 18d during a second predetermined time interval. In the exemplary embodiment, communication between the equipment cluster 18b and 18d is represented by the dashed line "B," as shown in FIG. 3.

The configuration controller 26a, as similarly described above, is adapted to communicate predetermined information to the data communication scheduler 26b for instructing the data communication scheduler 26b as to when to schedule data communications between at least two of the plurality of equipment clusters and the duration or time interval of the data communications, which defines a QOS for the transmitting equipment cluster 18, as described above. The configuration controller 26a is also adapted to provide control signals to the ports 28 for actuating the ports 28 to couple or form a communication relationship between two or more of the plurality of equipment clusters 18.

Referring to FIGS. 3 and 4, during operation of the remote-CLI 12 for controlling the network switch 14a, for example, a GET command may be entered at the remote user interface 12a that requests the remote-CLI 12 to get the name(s) of all equipment clusters that begin with the letter "M" and any related attributes (e.g., port number, on/off status, allocated QOS). The command processing engine 12b of the remote-CLI 12 receives and processes the GET command to verify that the GET command is a valid command and that any associated syntax or values are valid. The translation engine 12e of the remote-CLI 12 receives and processes the validated GET command to format the GET command to a predetermined protocol for communication to the network switch 14a over the computer network 16.

It should be understood that the command processing engine 12b, as well as, the filtering engine 12c, scripting engine 12d and/or the translation engine 12e can receive and process a plurality of control and/or configuration commands, such as the GET, SET, RUN SCRIPT, and SIMULCAST commands, as described above, to provide a plurality of validated or otherwise processed control and/or configuration commands, which are communicated to the network switch 14a. In this arrangement, the network switch 14a can receive and immediately execute the plurality of validated or otherwise processed control and/or configuration commands, which alleviate processing by the network switch 14a to itself, validate or process the commands.

In another embodiment, the network switch 14a can receive and re-validate the plurality of validated or otherwise processed control and/or configuration commands, which are received from the remote-CLI 12. This re-validation may occur when a configuration change (perhaps through a second command provided by the local-CLI 22) may have already occurred, necessitating a re-check of the validity of the command received from the remote-CLI 12. For example, if the command provided by the remote-CLI 12 were to establish QoS parameters between two ports, e.g., 28a, 28c, an intervening or previously received configuration change (perhaps through a second command provided by the local-CLI 22) may have already established the QoS parameters between the two ports 28a, 28c.

In an embodiment, the predetermined protocol includes a protocol that is readable by the network switch 14a, such as SNMP. The master-agent 24a located on the network switch 14a receives and processes the GET command by interacting the GET command with the registration table 24a' to locate which sub-agent, 24d, 24c or 24b should provide the name(s) of all equipment clusters 18 and any related attributes back to the filtering engine 12c located on the remote-CLI 12, via the computer network 16. The filtering engine 12c receives and filters the name(s) of all of the equipment clusters 18 and related attributes to provide the name(s) of all equipment clusters that begin with the letter "M" and any related attributes to the command processing engine 12b. In the exemplary embodiment, the equipment cluster 18a includes a name (e.g. Moe) beginning with the letter M and is thus reported to the command processing engine 12b along with the attributes of equipment cluster 18a.

In addition, a SET command can be entered into the remote user interface 12a of the remote-CLI 12 for taking down or turning-off a predetermined interface port, such as interface port 28a, for taking down equipment cluster 18a. The command processing engine 12b of the remote-CLI 12 receives and processes the SET command to verify that the SET command is a valid command and that any associated syntax or values are valid. The translation engine 12e of the remote-CLI 12 receives and processes the validated SET command to format the SET command to the SNMP protocol for communication to the network switch 14a over the computer network 16. The master-agent 24a located on the network switch 14a receives and processes the SET command by interacting the SET command with the registration table 24a' to associate the SET command with a predetermined one of the sub-agents 24b, 24c or 24d, which previously registered with the master-agent 24a as having resources for processing the SET command and which registration is stored in the registration table 24a' of the master-agent 24a. In the exemplary embodiment, the predetermined one of the sub-agents 24b, 24c, 24d that includes resources from processing the SET command is sub-agent 24b.

In accordance with the exemplary embodiment, sub-agent 24b receives and processes the SET command by interacting the SET command with the MIB 24b' of the sub-agent 24b to associate the SET command with any instructions or sequences of steps for executing the SET command. The instructions or sequence of steps for executing the SET command may be provided to the configuration controller 26a defined on the port controller 26 for permitting the configuration controller 26a to execute the instructions or sequence of steps to control predetermined logic to actuate interface port 28a to take down or turn off interface port 28a. The configuration controller 26a is further responsive to instruct the data communication scheduler 26b of the port controller 26 to discontinue any scheduled QOS or other resources allocated to interface port 28a because interface port 28a port-1 has been taken down. It should be understood that taking down interface port 28a has been described hereinabove for exemplary purposes and that any of the remaining interface ports 28b, 28c, 28d may also be similarly controlled.

In an embodiment, the configuration controller 26a may be programmed to re-allocate system resources previously allocated to a port, such as port 28a that has been taken down, to another predetermined port, such as port 28b, for providing additional resources to equipment cluster 18b, which is coupled to port 28b. In another embodiment, the configuration controller 26a may be programmed to re-allocate system resources previously allocated to a port, such as port 28a that has been taken down, equally to two or more of the ports 28b, 28c, 28d for equally providing additional system resources to two or more of the equipment clusters 18b, 18c, 18d, which are respectively coupled to the ports 28b, 28c, 28d.

It should be understood that the above described exemplary GET and SET commands have been described in detail hereinabove for illustrative purposes and are in no way limiting. It should be further understood that a plurality of other network switch control and/or configuration commands can be executed remotely using the remote-CLI 12 or locally using the local-CLI 22 to control and configure the network switch 14a in accordance with aspects of the present invention.

There are many advantages to the remote-CLI 12 including, but not limited to, alleviating resources of the network switch 14a by decoupling the processing of control and/or configuration commands, as well as the processing of resource intensive queries or scripts, from the network switch 14a and processing such commands on the remote-CLI 12. Further, the remote-CLI 12 may provide simulcast features that permit the remote-CLI 12 to simultaneously communicate information to two or more selected network switches 14a, 14b, or 14c. The remote-CLI is also scaleable or extendable to include a plurality of customized commands and/or scripts for carrying out a number of network switch operations.

Having described the preferred embodiments of the invention, it will now become apparent to one of ordinary skill in the art that other embodiments incorporating their concepts may be used. It is felt therefore that these embodiments should not be limited to disclosed embodiments.

What is claimed is:

1. A programmable remote device management system coupled to at least one communication network switch over a computer network, the programmable remote device management system comprising:
    a command processing engine adapted to receive at least one switch command via a user interface; and
    a protocol translation engine coupled to the command processing engine, wherein the command processing engine processes the at least one switch command for providing at least one validated switch command to the network switch via the protocol translation engine and the computer network to control predetermined attributes of the communication network switch.

2. The programmable remote device management system of claim 1, further including a filtering engine coupled to the command processing engine and being operative to interface to the communication network switch via the protocol translation engine and the computer network for data mining at least one predetermined database located on the communication network switch to collect predetermined switch information.

3. The programmable remote device management system of claim 1, further including a scripting engine coupled to the command processing engine and being responsive to receipt of the at least one validated switch command from the command processing engine for executing at least one programming construct to provide predetermined scripted commands to the communication network switch for further controlling the predetermined attributes of the communication network switch.

4. The programmable remote device management system of claim 3, wherein the scripting engine includes an extendable scripting command language.

5. The programmable remote device management system of claim 3, wherein the scripting engine includes a predetermined scripting algorithm including at least one of TCL, Perl, Python, Ruby and BASH.

6. The programmable remote device management system of claim 1, wherein the protocol translation engine is adapted translate the validated switch command to at least one of SNMP, RPC, SOAP, XML-RPC and CORBA.

7. The programmable remote device management system of claim 1, including at least one of a personal computer, workstation, personal digital assistant and wireless communication device.

8. A communication network switch adapted to receive at least one validated switch command over a computer network from a remote management device, the communication network switch comprising:
- a master agent in communication with the remote management device;
- a plurality of sub-agents in communication with the master agent; and
- a configuration controller in communication with each of the plurality of sub-agents; and
- a data communication scheduler in communication with the configuration controller, wherein the master agent is operative to receive and redirect at least a first validated switch command to a predefined one of the plurality of sub-agents for processing the first validated switch command to provide at least a first switch command and wherein the configuration controller receives and processes the first switch command to provide at least a first actuation signal to at least one interface port located on the network switch to actuate at least one element of the at least one interface port to a predetermined state for controlling predetermined equipment coupled to the at least one element of the at least one interface port.

9. The communication network switch of claim 8, wherein the at least one element includes one or more switch ports.

10. The communication network switch of claim 8, wherein the master agent includes a task registration table adapted to be compared with the validated switch command to generate an identifier associated with at least one of the plurality of sub-agents responsible for processing the validated switch command.

11. The communication network switch of claim 10, wherein each of the plurality of sub-agents includes a MIB having a plurality of information related to attributes of the communication network switch.

12. The communication network switch of claim 8, further including a local device management system coupled to the master agent and being operative to provide at least a second validated command to the master agent.

13. The communication network switch of claim 8, wherein the local device management system includes;
- a command processing engine;
- a local user interface coupled to the command processing engine; and
- a protocol translation engine coupled to the command processing engine, wherein the command processing engine is adapted to receive at least one switch command via the local user interface and to process the at least one switch command for providing at least the second validated switch command.

14. The communication network switch of claim 13, further including a filtering engine coupled to the command processing engine and being operative to interface to the master agent for data mining the task registration table located on the master agent to collect predetermined switch information.

15. The communication network switch of claim 14, further including a scripting engine coupled to the command processing engine and being responsive to receipt of the second validated switch command from the command processing engine for executing at least one programming construct to provide predetermined scripted commands to the master agent to control predetermined attributes of the network switch.

16. The communication network switch of claim 15, wherein the scripting engine includes an extendable scripting command language.

17. The communication network switch of claim 15, wherein the scripting engine includes at least one of TCL, Perl, Python, Ruby and BASH.

18. The communication network switch of claim 13, wherein the protocol translation engine is adapted translate the validated switch command to at least one of SNMP, RPC, SOAP, XML-RPC and CORBA.

19. A method of operating a programmable remote device management system coupled to at least one communication network switch over a computer network, the method comprising:
- receiving at least one switch command at a command processing engine located on the remote device management system;
- processing the at least one switch command at the command processing engine for providing at least one validated switch command;
- receiving and processing the validated switch command at a protocol translation engine located on the remote device management system for providing the at least one validated switch command in a predetermined protocol; and
- providing the at least one validated switch command in the predetermined protocol to the network switch via the computer network, wherein the network switch executes the at least one validated switch command in the predetermined protocol for controlling predetermined attributes of the communication network switch.

20. The method of claim 19, wherein controlling the predetermined attributes of the communication network switch includes actuating one or more ports located on the communication network switch for controlling a plurality of equipment coupled to the one or more ports.

* * * * *